United States Patent [19]

Padovani

[11] Patent Number: 4,609,339
[45] Date of Patent: Sep. 2, 1986

[54] MATRIX MOLD FOR MAKING STACKABLE CONTAINERS

[75] Inventor: Pietro Padovani, Verona, Italy

[73] Assignee: Officine Meccaniche Veronesi SpA (O.M.V.), Parona, Italy

[21] Appl. No.: 783,412

[22] Filed: Oct. 3, 1985

Related U.S. Application Data

[63] Continuation of Ser. No. 665,103, Oct. 26, 1984, abandoned.

[30] Foreign Application Priority Data

Feb. 10, 1984 [IT] Italy .................. 84907 A/84

[51] Int. Cl.[4] .................. B29C 39/26; B29C 49/48
[52] U.S. Cl. .................. 425/383; 249/74; 249/122; 249/136; 249/142; 249/151; 249/155; 249/176; 249/181; 425/537; 425/556
[58] Field of Search ......... 425/383, 398, 522, DIG. 5, 425/387.1, 388, 537, 554, 556, 557; 249/74, 117, 142, 151, 152, 155, 181, 176, 122, 136

[56] References Cited

U.S. PATENT DOCUMENTS 3,995,763 12/1976 Ayres et al. .................. 425/398
4,533,312 8/1985 Von Holdt .................. 249/155

FOREIGN PATENT DOCUMENTS 2034125 1/1972 Fed. Rep. of Germany .
3145354 5/1983 Fed. Rep. of Germany .
1247480 9/1971 United Kingdom .
2079668 5/1984 United Kingdom .

*Primary Examiner*—Willard E. Hoag

[57] ABSTRACT

The invention relates to a matrix mold, in which at least one mold cavity is bounded by the head of an ejector at the lower opening of a cup, from which in the substantially truncated conical wall of this cup, widening upward, facing the interior, by at least two grooves in the lower part of the cup and by teeth disposed in the interior of these groove, which are radially slidable in a radial direction by an eccentric arrangement, and in which the diameter of the head is greater than the smallest diameter of the mold cavity.

11 Claims, 7 Drawing Figures

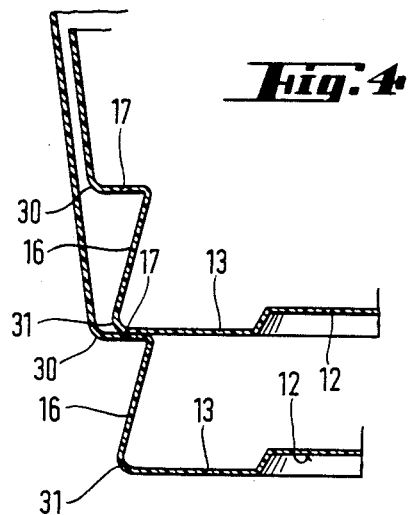
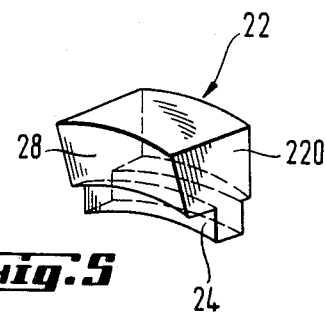
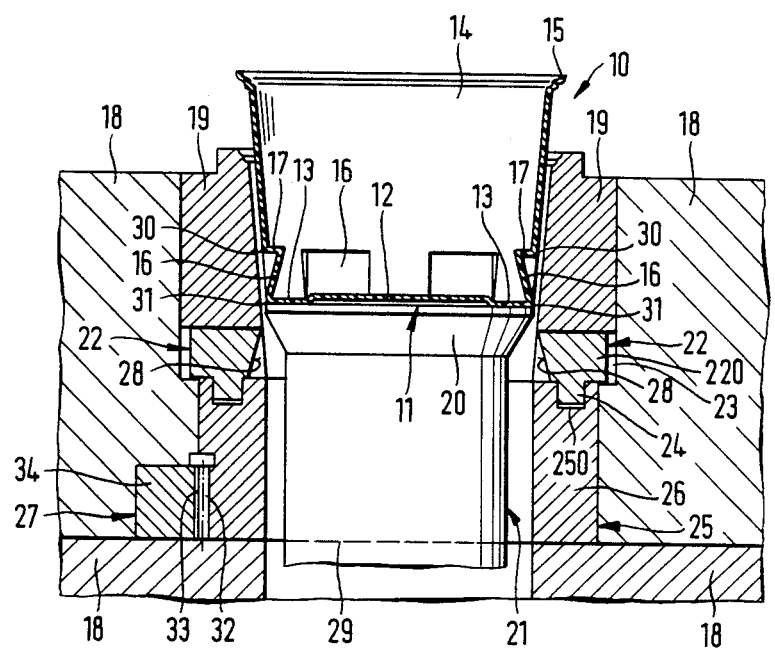
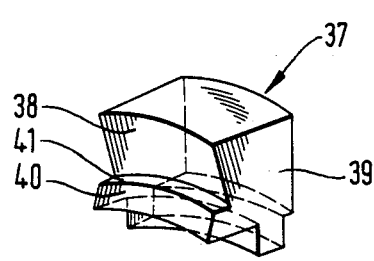

MATRIX MOLD FOR MAKING STACKABLE CONTAINERS

This is a continuation of co-pending application Ser. No. 665,103 filed Oct. 26, 1984, now abandoned.

BACKGROUND OF THE INVENTION

The invention relates to a matrix mold useful for the production of stackable containers, such as bowls and the like by molding of plastic foils. Preferably, these containers, carry on the wall one or more notches situated in the vicinity of the bottom or remote from it.

U.S. Pat. No. 3,172,159 teaches a matrix mold which interacts with a complementary matrix (male die). This matrix form contains at least one cup as boundary of a substantial truncated conical cavity widening upward and an ejector head which is well borne on the bottom of the cup.

The cup is provided with an annular stop springing back into the wall and with a counter-running conical ring between the edge of the stop and of the step, which is remote from the bottom of the mold cavity.

The counter-running conical ring of the cup prevents the ejection of the container, as it radially compresses the truncated conical ring of the container, and often impairs its appearance by furrows, cracks and dents which sometimes bring about a breakage.

The materials used in this mold, therefore, must be highly elastic and thereby also expensive, while the breakable and rigid materials, such as, for example, transparent polystyrene, are unsuited for use with such a mold.

Moreover, this mold, because of the limited radial dimensions of the stop yields containers which can be nested in one another with a variable stacking spacing. This results in containers which tend to stick or jam together, so that stacks of such containers cannot be easily used with automatic units.

If the counter-running conical ring of the container is locked in the vicinity of the bottom (see e.g. German Pat. No. 1,971,968 and Great Britain Pat. No. 865,025, FIGS. 4 and 5), and, namely, also if it consists of segments between there are present spacings along the circumference (see e.g. Great Britain Pat. No. 1,015,351), in agreement with the U.S. patent mentioned, then, the diameter of the ejector head has to be smaller than the smallest diameter of the mold cavity. For which reason in these cases arching and deformation of the container bottom during ejection from the mold will likely occur.

BRIEF DESCRIPTION OF THE PRESENT INVENTION

The aim of the invention is to obviate the aforementioned disadvantages. The invention solves the problem of creating a matrix mold with mold cavities in which the counter-running conical ring or sections of the same projection toward the axis of the cavity do not hamper the ejecting of the container and in which the diameter of the ejector head is greater than the smallest diameter of the mold cavity. The problem is solved by the means that the counter-running conical ring is realized by sections arranged at will also at a distance from one another, which are introducible into grooves provided for them as soon as the molding of the container is completed.

The advantages achieved by the invention lie in that containers are produced the appearance of which is not impaired by furrows, cracks, dents, bulges or deformations of their bottoms, which can be nested in one another with a constant stacking spacing and consist of any plastic material, regardless of the degree of elasticity, of stiffness or of brittleness of the material. A further advantage is that there is made possible a great error tolerance for the edges in the vicinity of the resting and carrying planes of the stacked containers.

BRIEF DESCRIPTION OF THE DRAWINGS

The invention can be put into practice in various ways, and a concrete example of execution of the same is described with the aid of the appended drawing, applied to the production of stackable containers that present one or more counter-running conical notches on the wall in the vicinity of the bottom.

FIG. 4 is a cut-out from FIG. 1 on an enlarged scale;

FIG. 5 is a perspective view of a tooth;

FIG. 6 is a similar representation to that in FIG. 2 during the ejection of the container; and FIG. 7 is a section through a modified tooth.

DETAILED DESCRIPTION OF AN EMBODIMENT OF THE INVENTION

Figure 1:
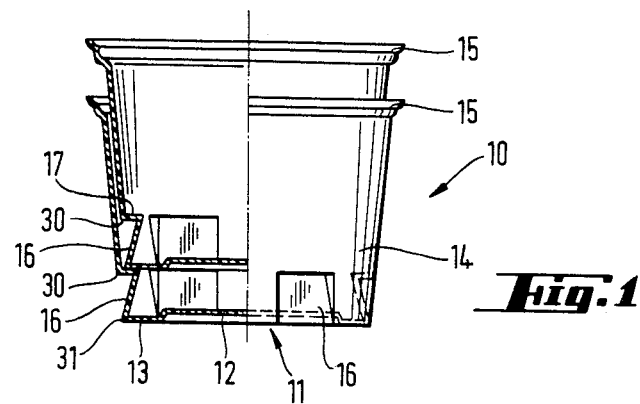
FIG. 1 shows two containers stacked into one another, half in elevation view and half in section.

Referring to FIG. 1, each solid-walled thin plastic container 10 has a bottom 11, which has a truncated conical indentation 12, which is connected with a flat ring 13, and a wall 14 extending upward and outward, which closes off at the top at an edge 15. Along the circumference of wall 14 notches 16 are arranged at intervals near the bottom 13 making it possible with their stops 17 for the containers to be easily stacked. It is noteworthy that the considerable radial width of the stops 17 and of the rings 13 makes errors in the formation of the edges of 30 and 31 inconsequential. For example, in FIG. 4 edges 30 and 31 are shown rounded because of a manufacturing error. But this error cannot lead to any change of the stacking interval, because edges 30 in the interior and edges 31 on the outside play no role in determining the stacking interval, which in the present case is always determined by the horizontal surfaces of the stops 17 which provide a resting surface for the parallel disposed rings 13.

Figure 2:
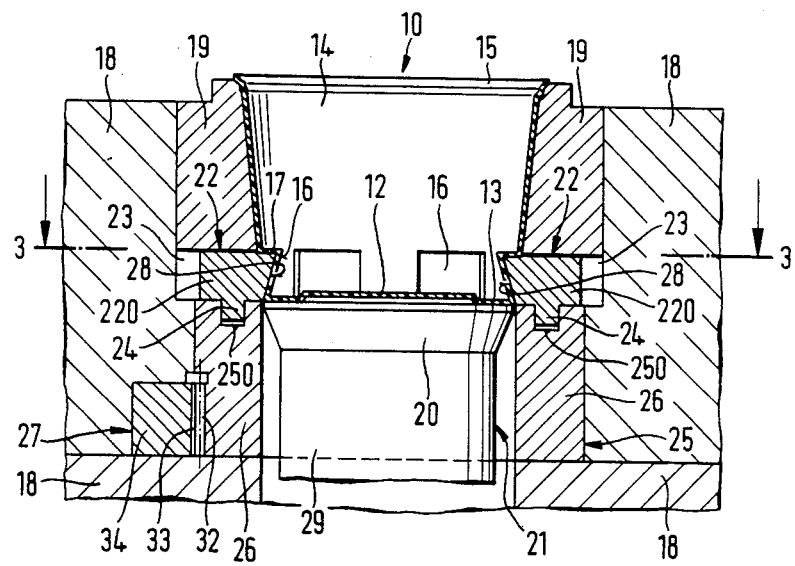
FIG. 2 depicts the vertical middle partial section through the mold cavity in which a container is present.
Figure 3:
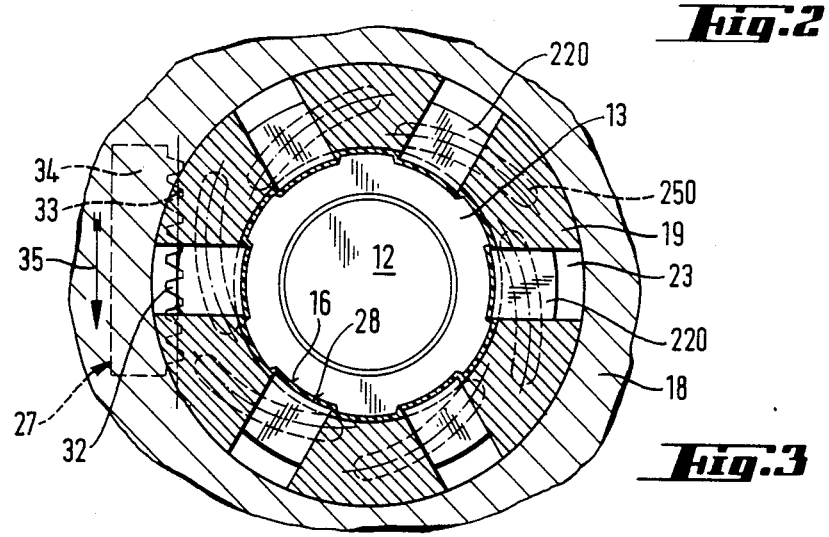
FIG. 3 shows the horizontal partial section through the mold along the line 3—3 of FIG. 2.

Turning to FIGS. 2, 3 and 5, the matrix mold 18 is a conical mold widening outward for the production of containers of the type described. The cavity is closed below by the head 20 of an ejector 21 with its shaft 29, and the cavity contains a cup 19 with grooves 23 running through its lower part which are arranged at intervals along the circumference and are open downward, as well as teeth 22, which in part project from these grooves toward the axis of the cavity.

Each tooth 22 contains a body part 22, a wall 28 formed conically running counter to the mold cavity and a slide skid 24 projecting downward from the grooves 23 which engages into an eccentric arrangement 25. The arrangement 25 consists of a cylindrical ring 26, in the upper part of which there are provided grooves 250 running eccentrically to it, in which there are borne the slide skids 24. The ring 26 is turnable clockwise and counterclockwise about the axis of the cavity, in part by means of a gear rack arrangement 27, which consists of a rod 34 with teeth 33 which engage teeth 32 on the outer wall of the ring 26.

Before the ejection of the container 10 from the cavity, in which it has been hot-molded and separated, the gear rack arrangement 27 when operated in the direction indicated by the arrow 35 in FIG. 3, causes the ring 26 to turn counter-clockwise, so that the grooves 250 push the slide skids 24 radially outward until the wall 28 of the teeth 22 has moved completely into the grooves 23. As soon as the teeth 22 have reached the position shown in FIG. 6, the container 10 is ejected by the head 20 and without any friction on the notches 16 ejected from the cavity.

Thereafter, the gear rack arrangement 27, is operated in the opposite direction to the arrow 35 in FIG. 3, so that the eccentric arrangement 25 returns the teeth 22 again into the position depicted in FIG. 2, which is suited for the production of a new container.

If only a single counter-running conically formed wall section is to be provided, which grasps the container along its circumference, even though this is not represented in the drawing, there can be provided two teeth 22 for each mold cavity, which lie diametrically opposite and whose wall 28 is lengthened in the form of a half circumference, which is suited for the bearing in a suitable circular groove which is open toward the axis of the cavity overcutting with the grooves 23.

In FIG. 7 another embodiment of a tooth is depicted. In this embodiment tooth 37 comprises a body part 39, a conically counter-running wall part 38, a conical wall part 40 and step 41 between the upper edge of the section 40 and the section 38, in order to obtain notches that are arranged at a spacing from the container bottom.

Those skilled in the art will appreciate that the gear rack arrangement 27 may be replaced by any hydraulic or pneumatic arrangement known per se, if desired.

Having described my invention with respect to the drawings, further modification will now suggest itself to those skilled in the art. Accordingly, the invention is not limited to the disclosed embodiments except as required by the appended claims.

I claim:

1. A matrix mold for use in manufacturing stackable containers, molded from plastic foil and cut-out, with at least one substantially truncated conical mold hollow space expanding upward, said mold comprising means defining a mold cavity having a bottom and a wall, the bottom of the cavity being provided by a head of an ejector; a plurality of at least three teeth slidably disposed in radial grooves open downward and arranged along the circumference at intervals in the lower part of said wall; and an eccentric arrangement for moving each of said teeth radially, said head presenting a larger diameter than the smallest diameter of the mold cavity.

2. The matrix mold according to claim 1, wherein each tooth comprises a body part with similar cross section to that of the grooves; a conical tooth wall running counter to the concavity of the mold cavity wall; and a slide skid projecting downward from the body part.

3. The matrix mold according to claim 2, wherein the eccentric arrangement comprises a clylindrical ring rotatable partially about the axis of the mold cavity, said ring having grooves which are located on the upper side thereof, run off-center to the ring and serve for the reception of the slide skids.

4. The matrix mold according to claim 3, further including a gear rack arrangement comprising a rod with teeth for engaging teeth formed in said ring.

5. The matrix mold according to claim 1, wherein each tooth comprises: a body part; a counter-running conical wall; a conical wall; a step between the upper edge of the conical wall and the counter-running conical wall; and a slide skid projecting downward from said body part.

6. The matrix mold according to claim 5, wherein the eccentric arrangement comprises a cylindrical ring rotatable partially about the axis of the mold cavity, said ring having grooves which are located on the upper side thereof, run off-center to the ring and serve for the reception of the slide skids.

7. The matrix mold according to claim 6, further including a gear rack arrangement comprising a rod with teeth for engaging teeth formed in said ring.

8. A matrix mold for stackable containers that are molded and cut out from a plastic foil, said matrix mold having at least one mold cavity of substantially truncated conical form, widening upward, said mold cavity having a bottom defined by an ejector and having a wall defining a cup and having interior grooves open downward in the lower part of the cup; at least two teeth slidably disposed in said interior grooves, said teeth each including a cam member; an eccentric arrangement including a ring member rotatable by gear rack arrangement, said ring member having a caming surface which co-acts with the cam members of the teeth for sliding said teeth radially when said ring member is rotated and wherein a head of said ejector presents a larger diameter than the smallest diameter of the mold cavity.

9. A matrix mold for the molding of stackable containers from a plastic foil, with at least one substantially truncated-conical mold cavity widening upward, said cavity having a bottom defined by a face surface of an ejector and having a side wall defining an inner surface of a sleeve; a plurality of sliders disposed in grooves in said side wall; each slider having a tooth-like projection arranged circumferentially and extending into the mold cavity at the bottom thereof, the projections being disposed on sides of said sliders facing the mold cavity; and an eccentric arrangement for moving said projections radially of the mold cavity, the diameter of the face surface of the ejector being greater than the distance apart of two projections lying diametrically opposite one another when in their position thrust forward into the mold cavity.

10. The matrix mold according to claim 9, wherein each of the sliders has a slide skid projecting downwardly.

11. The matrix mold according to claim 10, wherein the eccentric arrangement includes a gear rack and a cylindrical ring rotatable by means of said gear rack, said ring including spirally running grooves on its upper surface for receiving the slide skids projecting downwardly from the sliders.

* * * * *